(12) United States Patent
Bhuyan et al.

(10) Patent No.: US 11,853,448 B1
(45) Date of Patent: Dec. 26, 2023

(54) APPLYING TRANSACTIONAL LOCKS IN DISTRIBUTED TRANSACTIONS

(71) Applicant: INTUIT INC., Mountain View, CA (US)

(72) Inventors: Ranadeep Bhuyan, Karnataka (IN); Steven Michael Saxon, Rancho Mirage, CA (US); Aminish Sharma, Bangalore (IN)

(73) Assignee: INTUIT, INC., Palo Alto, CA (US)

( * ) Notice: Subject to any disclaimer, the term of this patent is extended or adjusted under 35 U.S.C. 154(b) by 0 days.

(21) Appl. No.: 18/161,966

(22) Filed: Jan. 31, 2023

(51) Int. Cl.
G06F 11/00 (2006.01)
G06F 21/62 (2013.01)
G06F 11/07 (2006.01)
G06F 11/34 (2006.01)

(52) U.S. Cl.
CPC ...... *G06F 21/6218* (2013.01); *G06F 11/0793* (2013.01); *G06F 11/3452* (2013.01)

(58) Field of Classification Search
CPC ............ G06F 11/0793; G06F 11/3452; G06F 11/0754; G06F 11/076
See application file for complete search history.

(56) References Cited

FOREIGN PATENT DOCUMENTS

| CN | 111541746 B | * | 4/2022 | ............ H04L 67/10 |
| CN | 114968563 A | * | 8/2022 | |

* cited by examiner

*Primary Examiner* — Katherine Lin
(74) *Attorney, Agent, or Firm* — Patterson + Sheridan, LLP

(57) ABSTRACT

The present disclosure provides techniques for recommending vendors using machine learning models. One example method includes generating a dependency graph based on one or more microservices, computing, for each microservice of the one or more microservices, a complexity score using the dependency graph, identifying a subset of the one or more microservices, wherein each microservice in the subset of the one or more microservices has a complexity score meeting a threshold value, and applying a transactional lock on each microservice in the subset of the one or more microservices.

14 Claims, 5 Drawing Sheets

APPLYING TRANSACTIONAL LOCKS IN DISTRIBUTED TRANSACTIONS

INTRODUCTION

Aspects of the present disclosure relate to applying transactional locks in distributed transactions.

A distributed transaction is a type of transaction that involves multiple databases or other resources that are located on different computers or servers. In a distributed transaction, a single logical unit of work is executed across multiple databases or resources, and the results of the transaction are generally either committed or rolled back on all participating resources as a single unit.

In a distributed transaction, a transactional lock is a mechanism used to ensure that only one transaction can access a specific resource at a time. This is important because multiple transactions accessing the same resource simultaneously can lead to conflicts and inconsistencies in the data.

Existing techniques to apply transactional locks in distributed transactions are not optimal, potentially resulting in too many or too few transactional locks being applied. In some architectures (e.g., two-phase commit (2pc) patterns), transactional locks are applied to all of the microservices, whereas in some other architectures (e.g., staged aggregate computations (Saga) patterns), transactional locks are applied to certain microservices determined by developers, usually based on their experience alone. These approaches can lead to a waste of resources (e.g., increased overhead) and more errors being propagated if a microservice fails in the distributed transactions.

Accordingly, improved systems and methods are needed for applying transactional locks in distributed transactions.

BRIEF SUMMARY

Certain embodiments provide a method for applying transactional locks in distributed transactions. The method generally includes generating a dependency graph based on one or more microservices, computing, for each microservice of the one or more microservices, a complexity score using the dependency graph, identifying a subset of the one or more microservices, wherein each microservice in the subset of the one or more microservices has a complexity score meeting a threshold value, and applying a transactional lock on each microservice in the subset of the one or more microservices.

Another embodiment provides a system for applying transactional locks in distributed transactions. The system generally includes a memory including computer-executable instructions and a processor configured to execute the computer-executable instructions. Executing the computer executable-instructions causes the system to generate a dependency graph based on one or more microservices, compute, for each microservice of the one or more microservices, a complexity score using the dependency graph, identify a subset of the one or more microservices, wherein each microservice in the subset of the one or more microservices has a complexity score meeting a threshold value, and apply a transactional lock on each microservice in the subset of the one or more microservices.

Still another embodiment provides a non-transitory computer readable medium for applying transactional locks in distributed transactions. The non-transitory computer readable medium generally includes instructions to be executed in a computer system, wherein the instructions when executed in the computer system perform a method for applying transactional locks in distributed transactions on a computing device requiring minimal run time processing. The method generally includes generating a dependency graph based on one or more microservices, computing, for each microservice of the one or more microservices, a complexity score using the dependency graph, identifying a subset of the one or more microservices, wherein each microservice in the subset of the one or more microservices has a complexity score meeting a threshold value, and applying a transactional lock on each microservice in the subset of the one or more microservices.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Figure 1:
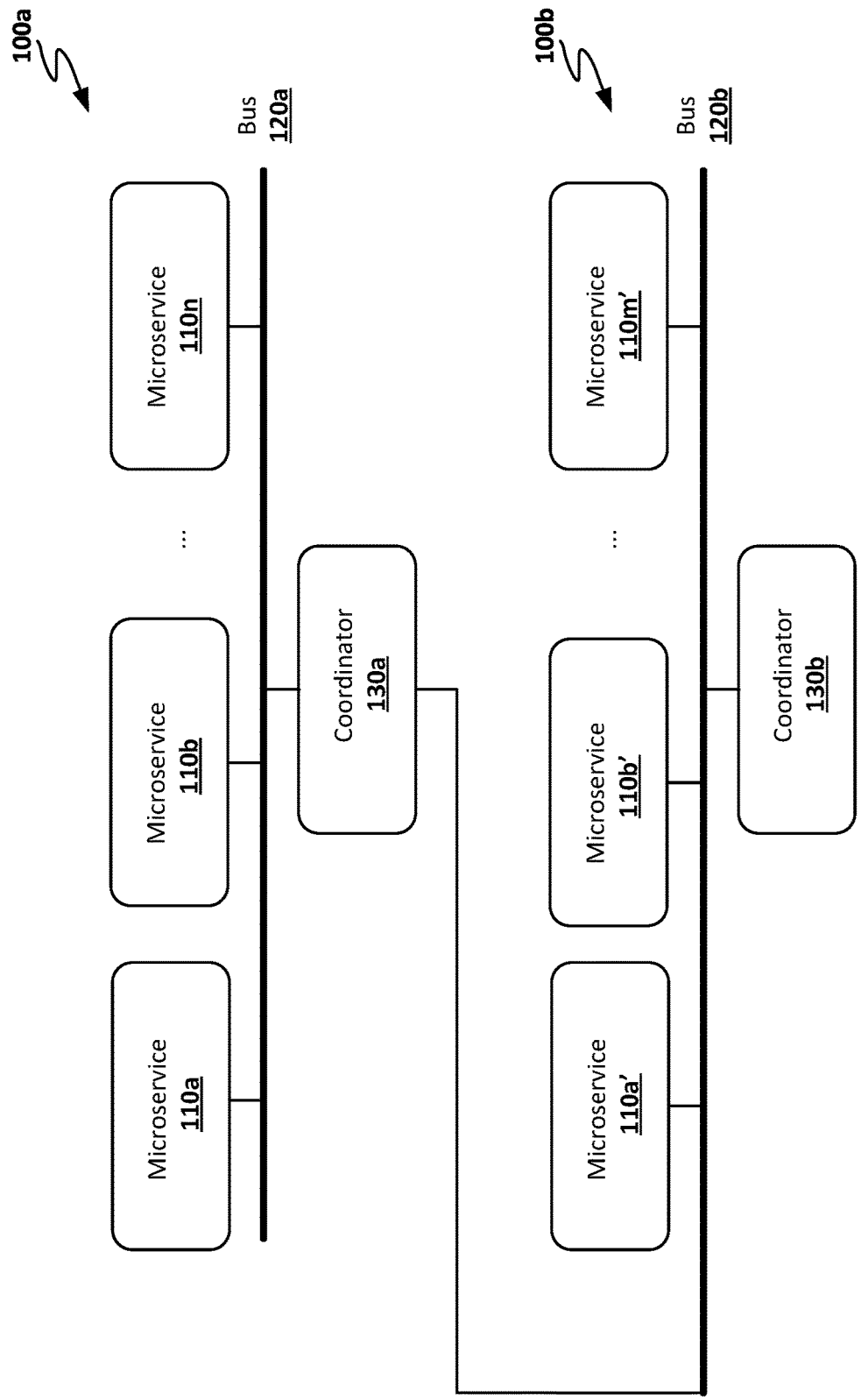
FIG. 1 depicts example distributed transactions.

Aspects of the present disclosure provide apparatuses, methods, processing systems, and computer-readable mediums for applying transactional locks in distributed transactions.

A transactional lock in a distributed transaction ensures that only one transaction can access a specific resource at a time, preventing conflicts and inconsistencies in the data. For example, in a staged aggregate computations (Saga) based distributed transaction, a transactional lock is used to ensure that only one stage (e.g., step) of a multi-stage distributed transaction can execute at a time. This helps to prevent conflicts between different stages of the transaction, and ensures that the transaction is atomic (e.g., either all or none of the stages of the transaction are completed).

However, transactional locks in distributed transactions are not applied optimally in existing techniques. In many environments, too many (e.g., in 2pc patterns) or too few transactional locks (e.g., in Saga patterns) are applied, resulting in waste of resources (e.g., increased overhead) and more errors (e.g., due to cascading effects when a microservice fails).

Embodiments of the present disclosure address these deficiencies in distributed transactions and resulting limitations in existing approaches that apply transactional locks in distributed transactions. Techniques described herein allow transactional locks to be applied to only the most critical services in distributed transactions.

A distributed transaction can include one or more microservices, which are usually deployed on different computing devices and work together to complete transaction tasks. In a Saga based distribution transaction, a transaction is broken into a series of smaller stages, each of which can be executed independently, and each stage can include one or more microservices.

According to certain embodiments, a dependency graph is first generated for microservices of a distributed transaction. For example, the dependency graph can be a directed graph, where each node of the dependency graph represents a microservice in the distributed transaction or the computing device associated with the microservice, and each directed edge represents the data flow from an upstream microservice to a downstream microservice.

Bottlenecks (e.g., points of failure) in the distributed transaction can then be identified using the dependency graph. A complexity score representing the likelihood of a microservice to fail can be calculated for each microservice in the distributed transaction using the dependency graph. For example, the complexity score can be calculated based on risk analysis techniques, such as risk priority number (RPN), through proxies indicating severity of a microservice to fail, probability of occurrence of the microservice to fail, and probability of detection of the microservice to fail. Accordingly, microservices whose complexity score meets a threshold value will be identified as bottlenecks (e.g., points of failure) in the data flow in the distributed transaction. Accordingly, transactional locks can be applied to these bottleneck microservices. Details regarding identifying the bottlenecks can be found below with respect to FIG. 2.

In some embodiments (e.g., with Saga patterns), the microservices in the distributed transaction are monitored by a coordinator. Microservices in the distributed transaction can listen to and publish to channels known as topics. The coordinator can monitor all topics in the distributed transaction, such as when a topic fails to be utilized by a microservice or when a microservice fails to publish to or reply to a topic. Accordingly, when a microservice fails, the coordinator can activate the transactional lock related to the topic, and initiate a compensating transaction for the microservice to revert the changes made by the microservice, if any.

By calculating a complexity score for each microservice in a distributed transaction, techniques described herein overcome deficiencies in existing techniques for applying transactional locks in distributed transactions. For example, while existing techniques may apply transactional locks to too many or too few microservices in a distributed transaction, resulting in resource waste or more errors, techniques described herein allow transactional locks to be applied to only bottleneck microservices having high risks of failure, thereby improving the functioning of the computing devices involved and avoiding errors. Furthermore, by utilizing risk analysis techniques in identifying the bottleneck microservices, techniques described herein help accurately identify bottleneck microservices. Embodiments of the present disclosure also improve the functioning of involved software applications as well as improve a user experience by performing distributed transactions with increased efficiency and with fewer errors than existing software applications that employ conventional techniques.

Example Distributed Transactions

FIG. 1 depicts example distributed transactions 100a-b. As depicted, transactions 100a-b are just two examples of distributed transactions in a distributed computing environment, and more or fewer transactions can be implemented in a distributed computing environment. Even though transactions 100a-b are depicted as having Saga patterns, other distributed computing patterns or architectures can be used. Although transactions 100a-b are depicted to include several stages, more or fewer stages can be included in transactions 100a-b. For simplicity, in this example, each microservice of transactions 100a-b represent one stage in the Saga pattern, though more microservices can be included in a stage.

Transaction 100a includes N stages, corresponding to microservices 110a-n, whereas Transaction 100b includes M stages, corresponding to microservices 110a'-m'. Each stage of transactions 100a-b can be executed independently, and the results of the stage are used to determine which subsequent stage should be executed next. For example, transactions 100a-b can include stages such as payload separation, order creation, payment processing, inventory update, order delivery, and so on, which are performed independently and in succession.

For simplicity, in this example, stages are executed in a consecutive order, such that the correct output of microservice 110a prompts executing microservice 110b, the correct output of microservice 110a' prompts executing microservice 110b', and so on.

Microservices 110a-n and 110a'-m' can listen to and publish to channels known as topics. As illustrated, bus 120a aggregates all topics in transactions 100a, whereas bus 120b aggregates all topics in transactions 100b. A topic can be used to transmit messages or broadcast events. Accordingly, a message or an event triggers the execution of a subsequent microservice through the bus.

A coordinator (e.g., as a process manager and/or an orchestrator) can be used to monitor each distributed transaction, which is responsible for listening to messages events and triggering endpoints. As illustrated, coordinator 130a monitors transaction 100a through bus 120a whereas coordinator 130b monitors transaction 100b through bus 120b. Operations of coordinators 130a-b include applying locks to microservices, determining that a microservice fails, activating transactional lock(s) applied to a failed microservice and/or its nearest upstream or downstream microservice with a transactional lock, and triggering the execution of a compensating transaction for the failed microservice. Details regarding applying locks to microservices can be found below with respect to FIG. 2.

Transactional locks can be applied to microservices identified as bottlenecks (e.g., points of failure most critical to the corresponding transaction or service). When activated, a transactional lock applied to a microservice prevents other microservices from accessing the inputs to and/or the outputs from the microservice, usually when the microservice fails. For example, if a transactional lock is applied to microservice 110a and microservice 110a fails, the transactional lock on microservice 110a can be activated (e.g., via a command by coordinator 130a) to prevent the topics that microservice 110a listens to, publishes to, or replies to from being accessed by other microservices. In some examples, a transactional lock is not applied to a microservice, and when the microservice fails, the transactional locks on its nearest upstream and/or downstream microservices with a transactional lock are activated instead (e.g., by the coordinator of the transaction).

A compensating transaction for a stage (e.g., a microservice) undoes (e.g. reverts) the effects of the stage in the original operation (e.g., transaction). The compensating transaction might not have to undo the work in the exact reverse order of the original operation, and it might be possible to perform some of the undo steps in parallel. The compensating transaction could also fail but is an eventually consistent operation. The compensating transaction can be resumed or retried at the point of failure and continue, so the steps (e.g., stages) in a compensating transaction should be defined as idempotent commands. A compensating transaction can be performed with one or more microservices.

In this example, some of microservices 110a'-m' of transactions 100b form compensating transactions for some of microservices 110a-n of transaction 100a. Accordingly, as depicted, coordinator 130a listens to and publishes commands to bus 120b in addition to bus 120a. For example, microservice 110b has a compensating transaction and fails. Following the discussion above, coordinator 130a can first activate a transactional lock on microservice 110b, or its nearest upstream microservices (e.g., microservice 110a) and/or its nearest downstream microservices (e.g., one of microservices 110c-n) with an available transactional lock, and then command its compensating transaction to execute through bus 120b. Details regarding activating locks can be found below with respect to FIG. 3.

Figure 2:
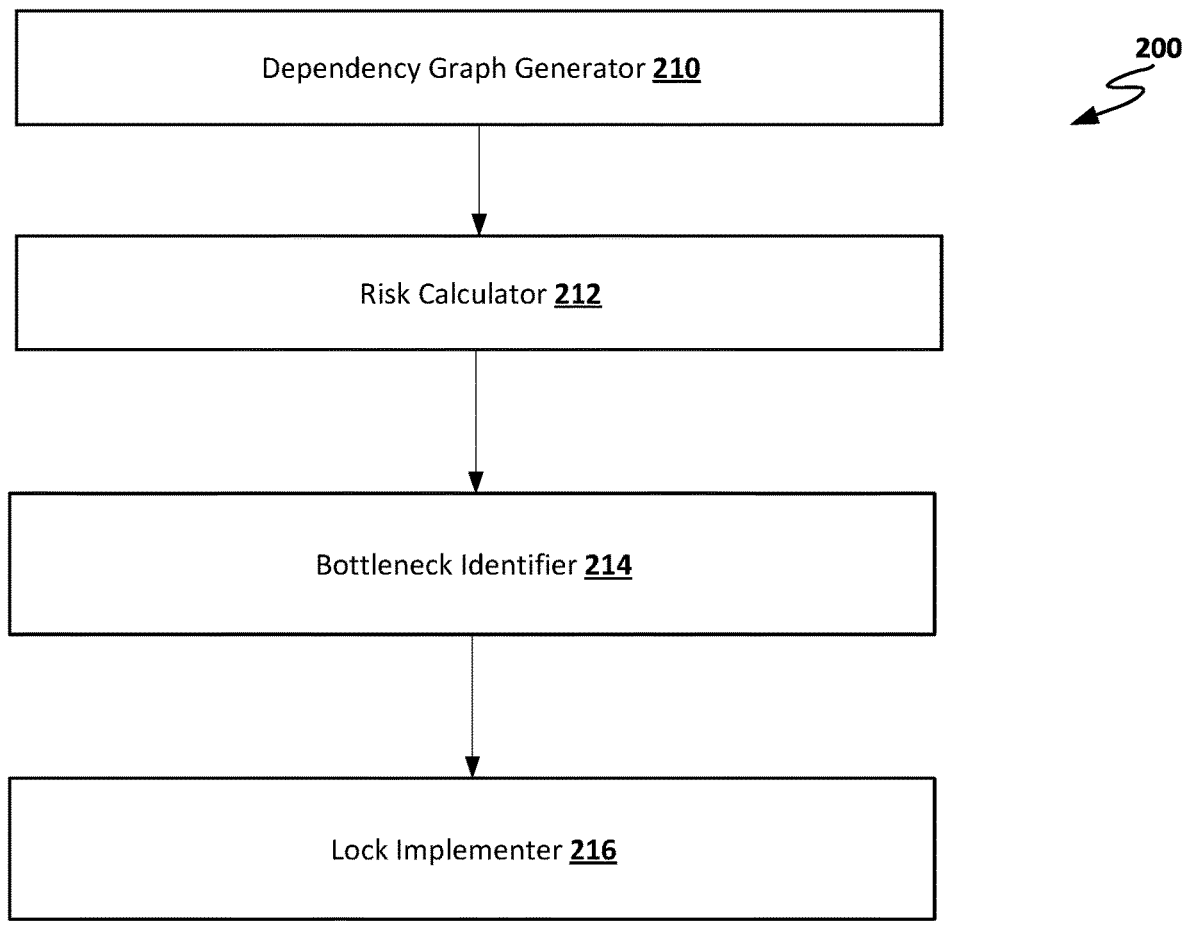
FIG. 2 depicts an example transactional lock applicator for applying transactional locks in distributed transactions.

Example Transactional Lock Applicator for Applying Transactional Locks in Distributed Transactions FIG. 2 depicts an example transactional lock applicator 200 for applying transactional locks in distributed transactions. Transactional lock applicator 200 can be used to apply transactional locks to microservices, such as microservices 110a-n and 110a'-m' as shown in FIG. 1. Transactional lock applicator 200 can be performed by a coordinator of a distributed transaction, such as coordinator 120a-b as shown in FIG. 1.

Transactional lock applicator 200 can include dependency graph generator 210. Dependency graph generator 210 can generate a dependency graph representing the data flow in the distributed transaction. For example, the dependency graph can be a directed graph, where each node of the dependency graph represents a microservice in the distributed transaction or the computing device associated with the microservice, and each outgoing edge represents the data flow from an upstream microservice to a downstream microservice.

In some examples, a microservice of the distributed transaction has a compensating transaction, as discussed with respect to FIG. 1, and dependency graph generator 210 generates the dependency graph including the data flow of the compensating transaction as well.

The dependency graph can be provided as input to risk calculator 212 to calculate a complexity score representative of the likelihood to fail for each node of the dependency graph. The complexity score can be calculated using risk analysis techniques, such as risk priority number (RPN). RPN is calculated as a product of severity of a risk, probability of occurrence of the risk, and probability of detection of the risk, where each component is an integer ranging from 1 to 10.

In some examples, following the discussion, risk calculator 212 computes a processing ability score for each node indicative of an ability of the corresponding microservice to process information, a modification ability score for each node indicative of an ability of the corresponding microservice to modify information, and a popularity score for each node indicative of upstream or downstream connections related to the corresponding microservice.

A complexity score can be generated for each node by combining (e.g., through multiplication) the processing ability score, the modification ability score, and the popularity score. For example, based on RPN, the processing ability score, the modification ability score, and the popularity score can be normalized into integers between 1 and 10, and the complexity score can be a product of the processing ability score, the modification ability score, and the popularity score.

The processing ability score can be regarded as a proxy for the probability of detection in RPN. The more easily the operations of a microservice are observed, the more likely that a problem in its operations is detected. In some examples, the processing ability score is computed based on one or more of a size of a team (e.g., of developers) related to the microservice, average experience of the team related to the microservice, processing capability of a computing device used to deploy the microservice, capability (e.g., of the coordinator or the developers) to monitor the microservice, or a ratio of a time to detect a failure in the microservice to a time to recover from the failure in the microservice.

The modification ability score can be regarded as a proxy for the severity (e.g., degree of impact) in RPN. The more changes a microservice performs, the greater impact the microservice will have upon the transaction. In some examples, the modification ability score is computed based on one or more of a number of check-ins for the microservice (e.g., a number of code check-ins, such as code changes in the middleware of the microservice) within a time window (e.g., for the past 12 hours), an average size of check-ins for the microservice within the time window (e.g., the size of code check-ins), or delta in sizes between the input to and the output of the microservice (e.g., size of change between input and output).

The popularity score can be regarded as a proxy for the probability of occurrence in RPN. The more inputs or outputs a microservice depends on or generates, the more likely the microservice will encounter issues. In some examples, the popularity score is computed based on one or more of a number of upstream or downstream connections of the microservice, a range (e.g., a minimum to a maximum) of payloads (e.g., sizes of inputs) of the microservice, a depth of the microservice in the dependency graph, or a number of minor edges (e.g., edges directed to nodes representing microservices that are not required by the microservice to execute) of the dependency graph of the microservice. Details regarding calculating some aspects of the popularity score can be found below with respect to FIG. 3.

In some examples, a node has historical processing ability scores, historical modification ability scores, and historical popularity scores. For example, the historical scores can be records from a period of time (e.g., for the past 3 years). Accordingly, the processing ability score, the modification ability score, and the popularity score can be aggregated with the historical scores to calculate an average (e.g., mean, median, and/or the like) processing ability, an average modification ability score, and an average popularity score. The complexity score for the node can be the product of the average scores.

In some examples, a corresponding microservice of the node has a compensating transaction and the complexity score for the node is calculated based further on one or more of an average (e.g., mean, median, and/or the like) execution time of the microservice (e.g., time spent in the microservice), a median execution time for the compensating transaction, a median standard deviation of time to reach the depth of the dependency graph, or a standard deviation of the number of minor edges of the dependency graph.

Complexity scores can be provided as input to bottleneck identifier 214 to identify a subset of the microservices in a transaction to be the bottlenecks. For example, microservices corresponding to nodes with complexity scores meeting a threshold value can be identified as the bottlenecks. The threshold value can be pre-determined or calculated dynamically. In an example, the threshold value is set to 60 based on RPN. In another example, a complexity score higher than the 75 percentile complexity score is regarded as the threshold value.

The identified subset of microservices in the transaction can be provided as input to lock implementer 216 so that transactional locks may be applied to the identified subset of microsevices in the transaction. Transactional locks can be implemented by lock implementer 216 using various techniques, such as using a shared lock server or using a database to store lock information. The specific technique used depends on the requirements of the distributed transactions and the type of resources being accessed by the transactions.

Once transactional locks are applied to the bottleneck microservices, when one of the bottleneck microservices fail, a transactional lock can be activated to prevent other microservices from accessing the corrupted data related to (e.g., inputs to or outputs from) the bottleneck microservice, or to some of its upstream or downstream microservices. This can prevent the cascading effects causing more errors to appear, as discussed above with respect to FIG. 1. More examples regarding activating transactional locks can be found below with respect to FIG. 3.

Figure 3:
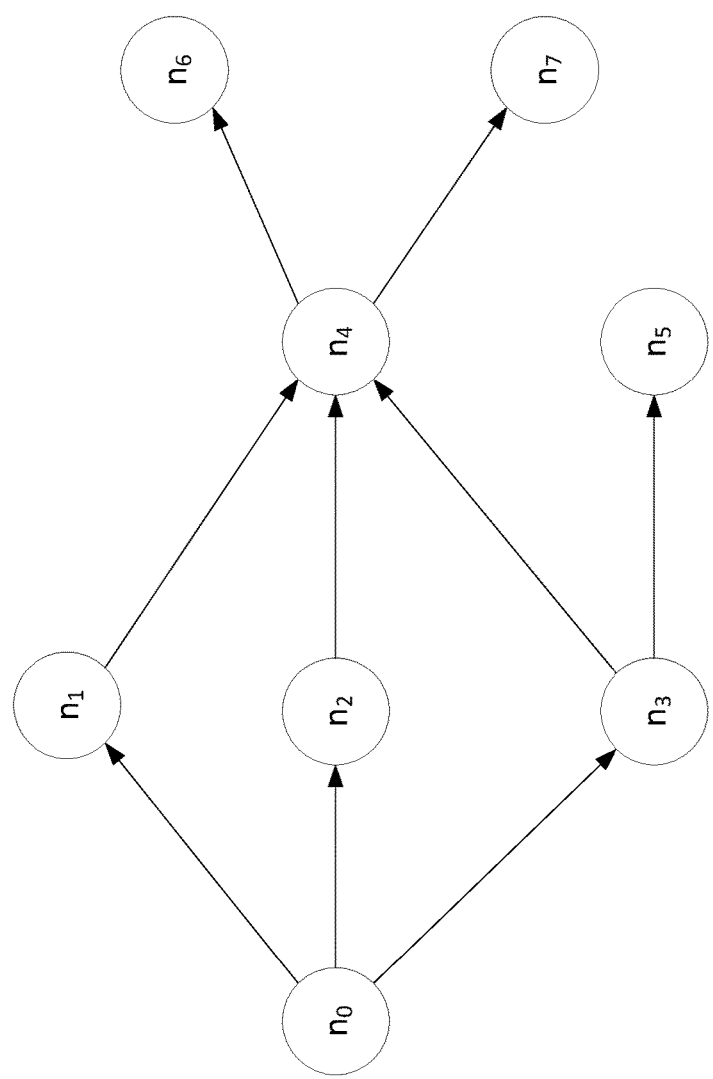
FIG. 3 depicts an example dependency graph for applying transactional locks in distributed transactions.

Example Dependency Graph for Applying Transactional Locks in Distributed Transactions FIG. 3 depicts example dependency graph 300 for applying transactional locks in distributed transactions. Dependency graph 300 can be a graph or a subgraph generated by dependency graph generator, such as dependency graph generator 210 as shown in FIG. 2. Although dependency graph 300 is depicted as a directed graph, dependency graph 300 can be represented using other formats, such as a graph that does not include directional information (e.g., a regular graph, known simply as a graph). As depicted, dependency graph 300 includes several nodes and several directed edges, and more or fewer nodes and/or directed edges can be included in dependency graph 300.

As depicted, dependency graph 300 includes nodes $n_0$ to $n_7$, and a plurality of directed edges representing the data flow between the nodes. For example, the directed edge from $n_1$ to $n_4$ denotes that the output data from $n_1$ is used as the input data to $n_4$. In this example, each node publishes a topic, such that $n_0$ publishes topic $T_0$, $n_1$ publishes topic $T_1$, and so on. For example, no can represent the payload separation microservice which takes user requests as inputs and assign requests to subsequent microservices.

As illustrated, $n_4$ has 3 upstream nodes, namely $n_1$, $n_2$, and $n_3$, and 2 downstream nodes, namely $n_6$ and $n_7$. Accordingly, $n_4$ has 3 upstream connections and 2 downstream connections, which can be used to calculate a popularity score for $n_4$, as discussed with respect to FIG. 2.

As illustrated, dependency graph 300 has a total depth of 3, and $n_4$ has a depth of 2 in dependency graph 300, which can be used to calculate the popularity score for $n_4$, as discussed with respect to FIG. 2.

As illustrated, $n_5$ is on a different branch from $n_4$ (e.g., from $n_3$), such that the output data of $n_4$ is not required by $n_5$ for successful execution, and vice versa. Therefore, the directed edge from $n_3$ to $n_5$ can be regarded as a minor edge in calculating the popularity score for $n_4$, as discussed with respect to FIG. 2.

In this example, $n_4$ is determined to be a bottleneck and a transactional lock is applied to $n_4$. Accordingly, when $n_4$ fails, a coordinator (not illustrated) can activate the transactional lock on $n_4$, such that $T_1$, $T_2$, $T_3$, and $T_4$ are not accessible for other nodes.

In a scenario, $n_3$ fails and messages in $T_3$ can be corrupted by errors. Subsequently, $n_4$ fails due to errors in inputs from $T_3$, and the transactional lock on $n_4$ is activated. Accordingly, $T_1$, $T_2$, $T_3$, and $T_4$ are made inaccessible for other nodes. Since there are errors in $T_3$ and $T_4$, making $T_3$ and $T_4$ inaccessible prevents the errors from being propagated (e.g., downstream from $n_3$ to $n_5$ and from $n_4$ to $n_6$ and $n_7$).

In some examples, some nodes can also reply to a topic, and the reply messages can change messages in the original topic. In a scenario, $n_6$ replies to $T_4$ through a reply topic $RT_4$, represented by a directed edge from $n_6$ to $n_4$ (not illustrated), where the messages in $RT_4$ are inputs to $n_4$ (e.g., used to update messages in $T_4$). When $n_6$ fails, messages in $RT_4$ can be corrupted by errors. Subsequently, $n_4$ fails due to errors in $RT_4$, and the transactional lock on $n_4$ is activated. Accordingly, $T_1$, $T_2$, $T_3$, $T_4$, and $RT_4$ are made inaccessible for other nodes. Making $T_4$ and $RT_4$ inaccessible prevents the errors from being propagated further upstream or downstream (e.g., to $n_7$).

Example Operations for Applying Transactional Locks in Distributed Transactions

Figure 4:
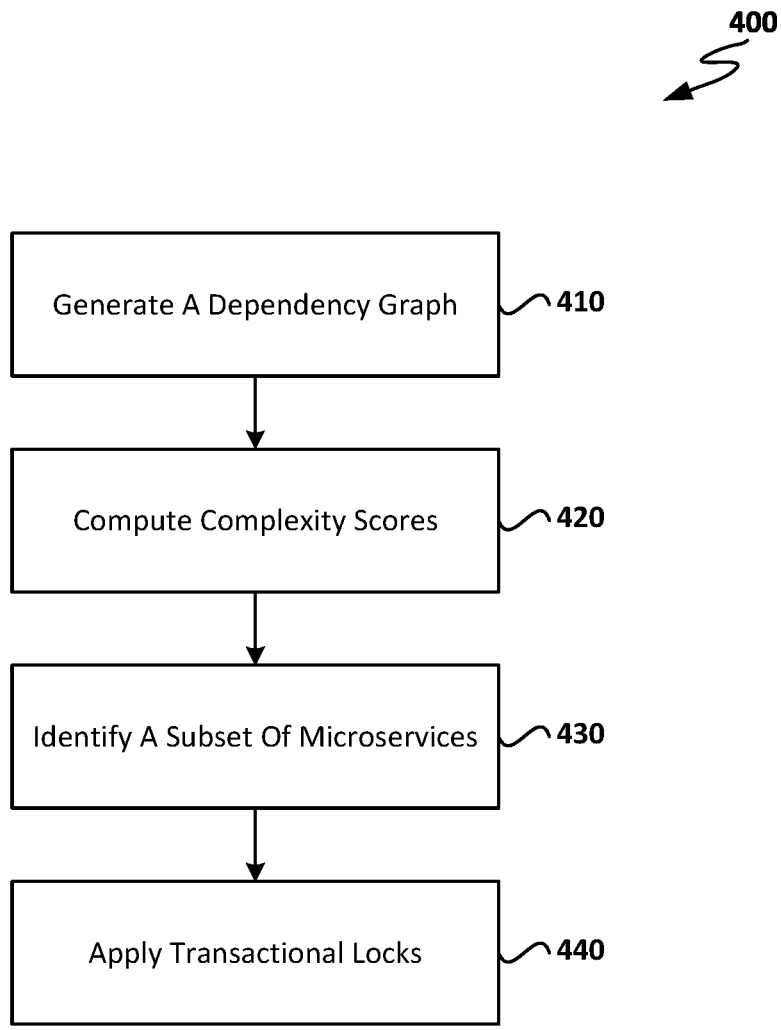
FIG. 4 is a flow diagram of example operations for applying transactional locks in distributed transactions.

FIG. 4 is a flow diagram of example operations 400 for applying transactional locks in distributed transactions. Operations 400 may be performed by a transactional lock applicator, such as transactional lock applicator 200 as illustrated in FIG. 2.

Operations 400 begin at 410, where a dependency graph is generated based on one or more microservices. For example, the dependency graph can be generated using dependency graph generator 210 as illustrated in FIG. 2.

At 420, a complexity score is computed for each microservice of the one or more microservices using the dependency graph. For example, the complexity score can be computed using risk calculator 212 as illustrated in FIG. 2.

In some embodiments, the complexity score is computed based on a processing ability score for each microservice of the one or more microservices indicative of an ability of the microservice to process information, a modification ability score for each microservice of the one or more microservices indicative of an ability of the microservice to modify information, and a popularity score for each microservice of the one or more microservices indicative of upstream or downstream connections related to the microservice, as discussed with respect to FIG. 2.

In some embodiments, additionally, the processing ability score is computed based on one or more of a size of a team (e.g., of developers) related to the microservice, average experience of the team related to the microservice, processing capability of a computing device used to deploy the microservice, capability (e.g., of the coordinator or the developers) to monitor the microservice, or a ratio of a time to detect a failure in the microservice to a time to recover from the failure in the microservice, as discussed with respect to FIG. 2.

In some embodiments, additionally, the modification ability score is computed based on one or more of a number of check-ins for the microservice (e.g., a number of code check-ins, such as code changes in the middleware of the microservice) within a time window (e.g., for the past 12 hours), an average size of check-ins for the microservice within the time window (e.g., the size of code check-ins), or delta in sizes between the input to and the output of the microservice (e.g., size of change between input and output), as discussed with respect to FIG. 2.

In some embodiments, additionally, the popularity score is computed based on one or more of a number of upstream or downstream connections of the microservice, a range (e.g., a minimum to a maximum) of payloads (e.g., sizes of inputs) of the microservice, a depth of the microservice in the dependency graph, or a number of minor edges (e.g., edges that are unrelated to the execution of the microservice) of the dependency graph of the microservice, as discussed with respect to FIG. 2.

In some embodiments, additionally, combining the processing ability score, the modification ability score, and the popularity score to generate the complexity score for the microservice comprises aggregating the processing ability score, the modification ability score, and the popularity score of the microservice with historical processing ability scores, historical modification ability scores, and historical popularity scores (e.g., from the past 3 years) of the microservice, computing a median processing ability score, a median modification ability score, and a median popularity score based on the aggregated scores, and computing a product of the median processing ability score, the median modification ability score, and the median popularity score, as discussed with respect to FIG. 2.

In some embodiments, additionally, the microservice has a compensating transaction and the complexity score is calculated based further on one or more of on one or more of an average execution time of the microservice, a median execution time for the compensating transaction, a median standard deviation of time to reach the depth of the dependency graph, or a standard deviation of the number of minor edges of the dependency graph, as discussed with respect to FIG. 2.

At 430, a subset of the one or more microservices is identified, wherein each microservice in the subset of the one or more microservices has a complexity score meeting a threshold value. The subset of the one or more microservices can be identified using bottleneck identifier 214 as illustrated in FIG. 2. In some embodiments, the threshold value is pre-determined. In some embodiments, alternatively, the threshold value is calculated dynamically based on the complexity scores of the one or more microservices.

At 440, a transactional lock is applied on each microservice in the subset of the one or more microservices. The transactional lock can be applied using lock implementer 216 as illustrated in FIG. 2.

In some embodiments, that a microservice in the subset of the one or more microservices fails a task is determined, and the transactional lock on the microservice is activated to block an input to or an output of the microservice from being accessed by other microservices of the one or more microservices, as discussed with respect to FIG. 3.

Example Application Server

Figure 5:
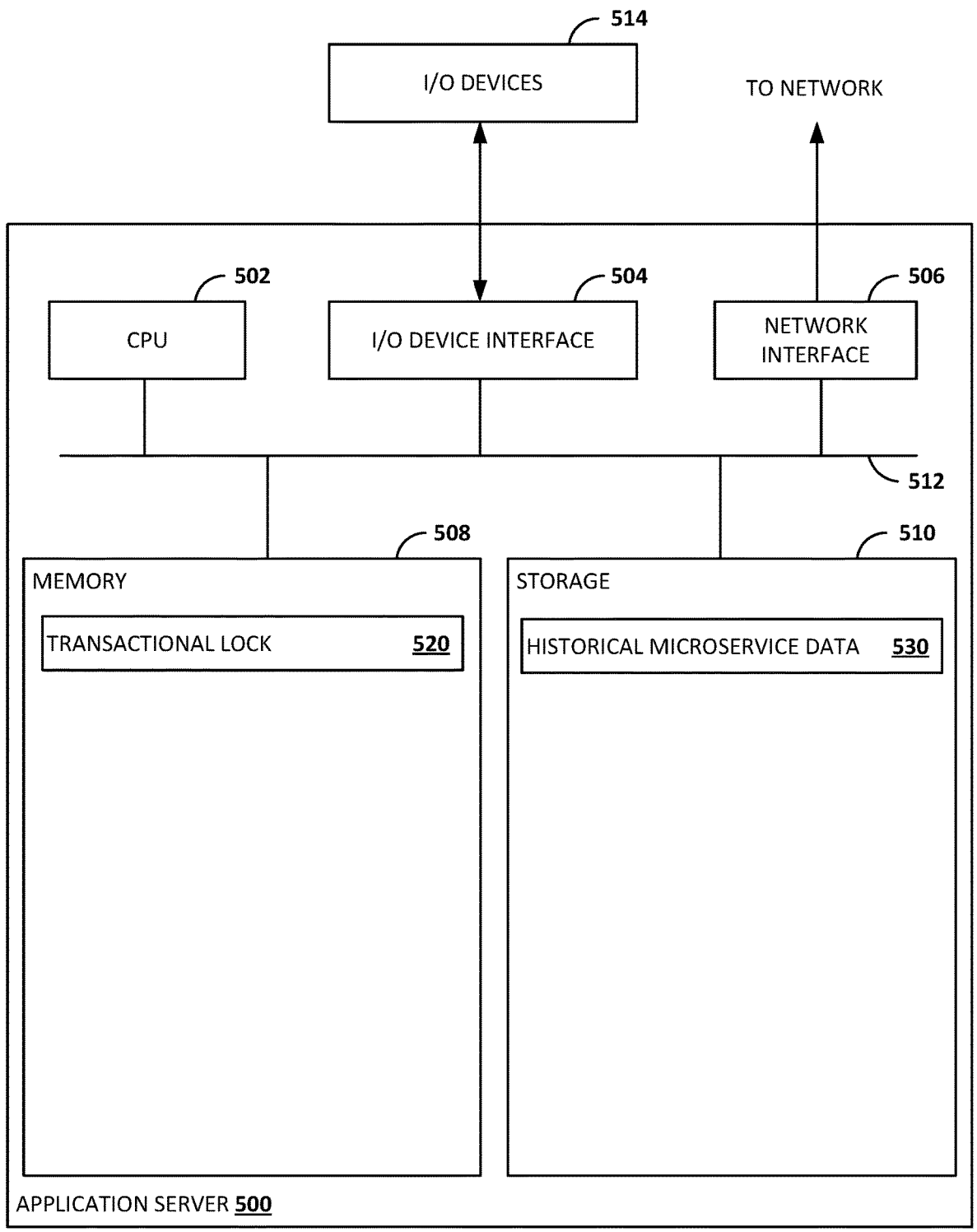
FIG. 5 depicts an example application server related to embodiments of the present disclosure.

FIG. 5 depicts an example application server 500, which can be used to deploy a coordinator, such as coordinators 130*a-b* illustrated in FIG. 1. As shown, application server 500 includes a central processing unit (CPU) 502, one or more input/output (I/O) device interfaces 504, which may allow for the connection of various I/O devices 514 (e.g., keyboards, displays, mouse devices, pen input, etc.) to application server 500, a network interface 506, a memory 508, a storage 510, and an interconnect 512.

CPU 502 may retrieve and execute programming instructions stored in memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to application server 500, such as keyboards, mice, touchscreens, and so on. Memory 508 may represent a random access memory (RAM), while storage 510 may be a solid state drive, for example. Although shown as a single unit, storage 510 may be a combination of fixed and/or removable storage devices, such as fixed drives, removable memory cards, network attached storage (NAS), or cloud-based storage. In some embodiments, storage 510 is an example of the database discussed with respect to FIG. 1.

As shown, memory 508 includes transactional lock applicator 520. Transactional lock 520 may be the same as or substantially similar to transactional lock applicator 200 illustrated in FIG. 2.

As shown, storage 510 includes historical microservice data 530. Historical microservice data 530 may be the same as or substantially similar to historical processing ability scores, historical modification ability scores, and historical popularity scores of microservices discussed with respect to FIG. 2.

It is noted that the components depicted in application server 500 are included as examples, and other types of computing components may be used to implement techniques described herein. For example, while memory 508 and storage 510 are depicted separately, components depicted within memory 508 and storage 510 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
generating a dependency graph based on one or more microservices;
computing, for each microservice of the one or more microservices, a complexity score using the dependency graph, wherein computing, for each microservice of the one or more microservices, the complexity score further comprises:
computing a processing ability score for each microservice of the one or more microservices indicative of an ability of the microservice to process information;
computing a modification ability score for each microservice of the one or more microservices indicative of an ability of the microservice to modify information;
computing a popularity score for each microservice of the one or more microservices indicative of upstream or downstream connections related to the microservice; and
combining the processing ability score, the modification ability score, and the popularity score to generate the complexity score for the microservice;
identifying a subset of the one or more microservices, wherein each microservice in the subset of the one or more microservices has a complexity score meeting a threshold value;
applying a transactional lock on each microservice in the subset of the one or more microservices;
determining that a microservice in the subset of the one or more microservices fails a task; and
activating the transactional lock on the microservice to block an input to or an output of the microservice from being accessed by other microservices of the one or more microservices.

2. The method of claim 1, wherein the processing ability score is computed based on one or more of:
a size of a team related to the microservice;
average experience of the team related to the microservice;
processing capability of a computing device used to deploy the microservice;
capability to monitor the microservice; or
a ratio of a time to detect a failure in the microservice to a time to recover from the failure in the microservice.

3. The method of claim 1, wherein the modification ability score is computed based on one or more of:
a number of check-ins for the microservice within a time window;
an average size of check-ins for the microservice within the time window; or
delta in sizes between an input to and an output of the microservice.

4. The method of claim 1, wherein the popularity score is computed based on one or more of:
a number of upstream or downstream connections of the microservice;
a range of payloads of the microservice;
a depth of the microservice in the dependency graph; or
a number of minor edges of the dependency graph of the microservice.

5. The method of claim 1, wherein combining the processing ability score, the modification ability score, and the popularity score to generate the complexity score for the microservice comprises:
aggregating the processing ability score, the modification ability score, and the popularity score of the microservice with historical processing ability scores, historical modification ability scores, and historical popularity scores of the microservice;
computing a median processing ability score, a median modification ability score, and a median popularity score based on the aggregated scores; and
computing a product of the median processing ability score, the median modification ability score, and the median popularity score.

6. The method of claim 1, wherein a microservice of the one or more microservices has a compensating transaction and the complexity score is calculated based further on one or more of:
an average execution time of the microservice;
a median execution time for the compensating transaction;
a median standard deviation of time to reach a depth of the dependency graph; or
a standard deviation of a number of minor edges of the dependency graph.

7. A system, comprising:
a memory including computer executable instructions; and
a processor configured to execute the computer executable instructions and cause the system to:
generate a dependency graph based on one or more microservices;
compute, for each microservice of the one or more microservices, a complexity score using the dependency graph, wherein computing, for each microservice of the one or more microservices, the complexity score further comprises:
computing a processing ability score for each microservice of the one or more microservices indicative of an ability of the microservice to process information;
computing a modification ability score for each microservice of the one or more microservices indicative of an ability of the microservice to modify information;
compute a popularity score for each microservice of the one or more microservices indicative of upstream or downstream connections related to the microservice; and
combine the processing ability score, the modification ability score, and the popularity score to generate the complexity score for the microservice;
identify a subset of the one or more microservices, wherein each microservice in the subset of the one or more microservices has a complexity score meeting a threshold value;
apply a transactional lock on each microservice in the subset of the one or more microservices;
determine that a microservice in the subset of the one or more microservices fails a task; and
activate the transactional lock on the microservice to block an input to or an output of the microservice from being accessed by other microservices of the one or more microservices.

8. The system of claim 7, wherein the processing ability score is computed based on one or more of:
- a size of a team related to the microservice;
- average experience of the team related to the microservice;
- processing capability of a computing device used to deploy the microservice;
- capability to monitor the microservice; or
- a ratio of a time to detect a failure in the microservice to a time to recover from the failure in the microservice.

9. The system of claim 7, wherein the modification ability score is computed based on one or more of:
- a number of check-ins for the microservice within a time window;
- an average size of checkin-ins for the microservice within the time window; or
- delta in sizes between an input to and an output of the microservice.

10. The system of claim 7, wherein the popularity score is computed based on one or more of:
- a number of upstream or downstream connections of the microservice;
- a range of payloads of the microservice;
- a depth of the microservice in the dependency graph; or
- a number of minor edges of the dependency graph of the microservice.

11. The system of claim 7, wherein combining the processing ability score, the modification ability score, and the popularity score to generate the complexity score for the microservice comprises:
- aggregating the processing ability score, the modification ability score, and the popularity score of the microservice with historical processing ability scores, historical modification ability scores, and historical popularity scores of the microservice;
- computing a median processing ability score, a median modification ability score, and a median popularity score based on the aggregated scores; and
- computing a product of the median processing ability score, the median modification ability score, and the median popularity score.

12. The system of claim 7, wherein a microservice of the one or more microservices has a compensating transaction and the complexity score is calculated based further on one or more of:
- an average execution time of the microservice;
- a median execution time for the compensating transaction;
- a median standard deviation of time to reach a depth of the dependency graph; or
- a standard deviation of a number of minor edges of the dependency graph.

13. A non-transitory computer readable medium comprising instructions to be executed in a computer system, wherein the instructions when executed in the computer system cause the computer system to:
- generate a dependency graph based on one or more microservices;
- compute, for each microservice of the one or more microservices, a complexity score using the dependency graph, wherein computing, for each microservice of the one or more microservices, the complexity score further comprises:
  - computing a processing ability score for each microservice of the one or more microservices indicative of an ability of the microservice to process information;
  - computing a modification ability score for each microservice of the one or more microservices indicative of an ability of the microservice to modify information;
  - compute a popularity score for each microservice of the one or more microservices indicative of upstream or downstream connections related to the microservice, and
  - combine the processing ability score, the modification ability score, and the popularity score to generate the complexity score for the microservice;
- identify a subset of the one or more microservices, wherein each microservice in the subset of the one or more microservices has a complexity score meeting a threshold value;
- apply a transactional lock on each microservice in the subset of the one or more microservices;
- determine that a microservice in the subset of the one or more microservices fails a task; and
- activate the transactional lock on the microservice to block an input to or an output of the microservice from being accessed by other microservices of the one or more microservices.

14. The non-transitory computer readable medium of claim 13, wherein a microservice of the one or more microservices has a compensating transaction and the complexity score is calculated based further on one or more of:
- an average execution time of the microservice;
- a median execution time for the compensating transaction;
- a median standard deviation of time to reach a depth of the dependency graph; or
- a standard deviation of a number of minor edges of the dependency graph.

* * * * *